Feb. 14, 1939.    G. HAGLUND    2,147,161
APPARATUS FOR PRODUCING BISULPHITE SOLUTIONS
Filed Feb. 24, 1937
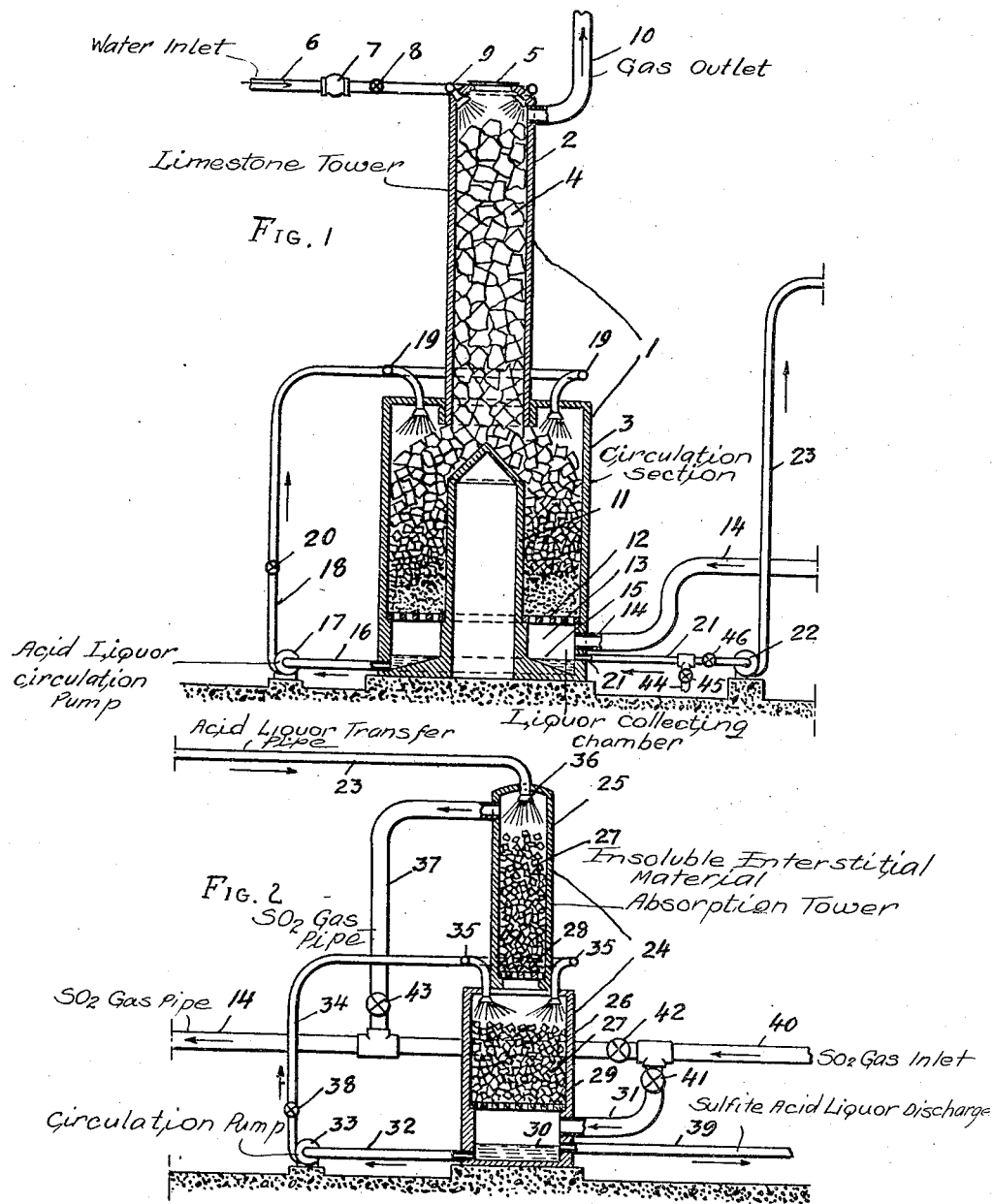
INVENTOR:
GUSTAF HAGLUND
BY: Francis E. Boyce
ATTORNEY Patented Feb. 14, 1939

2,147,161

UNITED STATES PATENT OFFICE 2,147,161

APPARATUS FOR PRODUCING BISULPHITE SOLUTIONS

Gustaf Haglund, Storangen, at Stockholm, Sweden

Application February 24, 1937, Serial No. 127,379
In Germany March 3, 1936

5 Claims. (Cl. 23—283)

The present invention relates to the production of bisulphite solutions, and more particularly to the production of calcium bisulphite solutions of the kind used in the production of sulphite cellulose or pulp. The object of the invention is to provide an improved apparatus or plant for the production of such solutions.

For the production of the so-called raw acid serving as the base of the calcium sulphite cooking liquor generally used in the production of sulphite cellulose a great number of different plants and processes have been proposed. The lime-containing raw material generally consists of limestone in lumps or finely divided limestone, and the construction of the apparatus and the manner of working is in accordance therewith. Most commonly limestone in lumps is used as in this case the mechanical construction of the apparatus is simpler, and further also very large units may advantageously be erected. Moreover, limestone in lumps is often easier and cheaper to obtain than finely divided limestone.

If limestone in lumps is used the plants for the production of such calcium bisulphite solutions (raw acid) generally consist of two towers filled with the limestone and connected with each other to a system wherein sulphur dioxide gas is passed upwards through the towers in series countercurrent to water supplied to the system and the acid formed in the towers. In the reactions taking place on the formation of the acid the limestone is consumed in a different degree in the two towers. The strongest consumption of limestone takes place in the tower where the fresh $SO_2$ gas is introduced into the tower system, and in order to obtain a uniform consumption of limestone in both towers the order of the towers in the system is changed at intervals.

The above mentioned plant and method, however, have several objectionable features. So, for instance, even under normal working conditions it is practically impossible to produce continually a raw acid of constant composition especially on account of the influence of the temperature on the speed of reaction. Consequently, in winter time the composition of the acid obtained is different from that obtained in summer time. Further, such plants are generally built for the production of a certain quantity of raw acid of a substantially definite composition and a change in the quantity produced will also result in a change in the composition of the acid. For the same reason, a regulation of the composition of the acid cannot be effected while maintaining the quantity unaltered. Generally speaking, there is little or no possibility of compensating in another direction a change occurring in one respect, nor, consequently, of regulating the working of such a plant.

When using apparatuses for finely divided limestone for the production of said calcium bisulphite solutions said difficulties may be more or less governed. Such apparatuses may be constructed in such a way that the production automatically of a raw acid of a composition as desired and substantially constant is secured. Further such apparatuses are smaller in size and consequently require a smaller ground area than the above-mentioned plants for limestone in lumps of corresponding capacity. The mechanical construction of the former, however, is considerably more complicated than that of the common tower plant and the building costs are also especially in case of units of great capacity considerably greater. In addition hereto often a special plant is required for the crushing of the limestone.

The present invention now relates to an apparatus or plant for the production of bisulphite solutions in which limestone in lumps is used whereby it is rendered possible to combine the advantages of the two above-mentioned types of plants and at the same time to avoid the disadvantages and difficulties connected therewith.

According to the invention said result is obtained by providing the acid tower with an upper section serving as a "weak acid tower" and a lower section which serves as a "strong acid tower", the lower tower section being of such a form or connected with the upper tower section in such a way that the limestone filling when sinking downwards on its passage from the upper tower section into the lower tower section is spread out and distributed laterally and is again sprinkled from above by means of trickling devices or sprinklers passing through the upper wall of the lower tower section and arranged above the limestone filling in said lower section, said trickling devices or sprinklers being connected with the acid collecting chamber at the bottom of the tower by means of a pump and connecting pipes.

The form of the lower tower section or the connection between said section and the upper tower section may with advantage be such that on the passage of the limestone filling sinking downwards from the upper section into the lower section there will be a free space between the limestone filling and the upper wall of said lower tower section. In said free space the above-mentioned trickling devices or sprinklers connected with the circulation pipe from the acid collecting chamber at the bottom of the tower may be arranged.

By means of the arrangement of said trickling and sprinkling devices according to the invention it is rendered possible to sprinkle the limestone filling in the lower tower section from above with the liquid collected in the acid chamber and circulated from there. The quantity circulated or the rate of circulation in relation to the quantity and composition of the $SO_2$ gas as well as the quantity of water supplied to the top of the tower may be regulated in such a way that the raw acid discharged from the tower has a definite content of lime. The working conditions may suitably be regulated in such a way that the gas passing upwards from the lower tower section serving as the strong acid tower has such a low content of $SO_2$ that said $SO_2$ is completely absorbed in the upper tower section serving as the weak acid tower.

According to the invention, consequently, a better result is obtained by means of an apparatus consisting of only one tower than by the use of the above-mentioned plant containing two towers in series. A change of any of the factors having an influence upon the production of the acid may easily be equalized or compensated by changing the quantity or rate of circulation in the lower tower section. Further evidently the building and working costs may be considerably reduced.

In such cases where a raw acid of definite, preferably high content of totally free $SO_2$ is desired according to the invention there is a further tower used in which the percentage of $SO_2$ in the said acid flowing off from the first tower and having a definite content of lime is enriched in totally free $SO_2$. Said second tower which preferably may contain a filling of rings, coke, pumice stones or the like of an insoluble material supported by gratings in the lower part of the upper and lower tower sections may suitably be of a form similar to that of the first-mentioned tower and, consequently, contain a free space above the filling in the lower tower section where trickling devices or sprinklers are arranged. From the top of said tower the acid of definite lime content supplied from the acid collecting chamber at the bottom of the first tower is trickling down through the tower counter current to the $SO_2$ gas passing upwards through the tower, and through the lower tower section the acid collected at the bottom of said section is circulated by means of said trickling devices arranged above the filling in this section and connected with the corresponding acid chamber by means of connecting pipes and a pump.

In this manner it is possible to accommodate exactly the composition of the acid to different conditions of digestion and to regulate the same with regard to the quality of the pulp to be produced.

In the accompanying drawing,

Fig. 1 is a vertical sectional view illustrating diagrammatically a suitable embodiment of a tower plant constructed in accordance with the present invention; and Fig. 2 is a similar view of a supplementary tower adapted for connection with the tower shown in Fig. 1 for enrichment of the gas produced in the main tower.

In the drawing 1 is the limestone tower consisting of the upper section 2 serving as the weak acid tower and the lower section 3 which serves as the strong acid tower. 4 is the filling of limestone in lumps in the tower. At the top the tower has an opening provided with a cover or lid 5 through which the limestones are introduced into the tower. Further, there is arranged the water supply pipe 6, the water-meter 7, a valve 8, the trickling device or sprinkler 9, and the gas exhaust pipe 10.

The two sections of the tower are preferably of a cylindrical form. In the embodiment shown in the drawing said sections are arranged concentrically in relation to each other, and the diameter of the lower section is considerably greater than that of the upper section. In the lower section there is in the centre built a middle part 11 which serves to deflect laterally the limestone filling sinking downwards from the upper section of the tower on its passage into the lower section and to spread out and distribute it in such a way that there will be a free space between the limestone filling and the upper wall of the lower section of the tower. The limestone filling in the tower is supported by a grating 12 in the tower section 3. In the free space 13 under said grating 12 opens the supply pipe 14 for the $SO_2$-gas. The lower part of this space 13 serves as a collecting chamber 15 for the liquid passing through the tower or the bisulphite solution (acid) which has been formed. By means of the pipes 16 and 18 connected by the pump 17 said chamber is connected with the free space above the limestone filling in the upper part of the section 3 where trickling devices or sprinklers 19 are arranged in a sufficient number and suitably disposed. The pump 17 is preferably so dimensioned that it can transfer a quantity of liquid, which is several times as great as the quantity supplied by the pipe 6. For the discharge of the raw acid formed from the acid chamber 15 there is arranged an overflow pipe 21 with the branch pipe 44.

In case the acid produced in the tower 1 in conformity with the above is to be enriched in its content of free $SO_2$ the pipe 21 is connected with a second tower 24 by means of the pump 22 and the pipe 23 which ends in a sprinkler 36. The tower 24 which generally can be considerably smaller than the tower just described consists like the latter of an upper section 25 and a lower section 26 of a greater diameter. In the embodiment shown in the drawing the sections 25 and 26 are both provided with a filling 27 of rings, coke, pumice stones or the like of an insoluble material which are supported by gratings 28 and 29 arranged in the lower part of said tower sections 25 and 26. A middle part like the part 11 in the tower 1 is here superfluous. Under the grating 29 there is a free space serving as a collecting chamber 30 for the acid which has been produced. Into said chamber also a gas supply pipe 31 opens which branches off from the main gas supply pipe 40. Said main gas pipe 40 is also connected with the gas supply pipe 14 leading to the tower 1 already mentioned. The chamber 30 is further by means of the pipes 32 and 34 connected, via the pump 33, with the upper part of the tower section 26 where the pipe 34 ends in a trickling device 34 arranged in the free space above the filling. For the discharge of the acid from the chamber 30 an overflow pipe 39 is arranged and for the gas escaping from the upper tower section 25 there is a discharge pipe 37 connected with the gas supply pipe 14.

The plant works in the following manner:

If it be supposed that at first only the limestone tower is to be set working, the valves 41 and 43 in the gas supply pipes and the valve 46 in the overflow pipe 21 are kept closed, while the valves 42 and 45 are kept open. The $SO_2$-gas is for instance introduced at the bottom of the tower 1 direct from sulphur or pyrites furnaces through the pipes 40 and 14. At the top of the tower the pipe 6 continually supplies a quantity of water regulated in relation to the quantity of acid to the produced and trickled down through the tower. By means of the circulation pump 17 the liquid collected in the chamber 15 is circulated through the tower section 3.

By appropriate regulation of the valves 8, 20 and 42 the working of the tower may be exactly regulated. The absorption and reaction conditions, consequently, may be regulated in such a way that the $SO_2$ content of the gases may be practically wholly absorbed in the tower, and at the same time a raw acid of definite composition can be obtained. The upper section of the tower serves here especially for the achievement of a complete absorption of the $SO_2$-content of the diluted gases passing upwards from the lower tower section which are here brought into contact with fresh water and limestone. In the lower tower section on the other hand the dissolution of the lime takes place whereby a solution of the desired lime content is obtained. If namely the valve 20 is kept more or less open, the supply of water and gas being kept constant, the quantity of liquid circulated through the tower section 3 or the rate of circulation and consequently also the quantity of lime dissolved, that is the content of lime in the raw acid will change correspondingly, said acid being discharged through the overflow pipe 21 and the branch pipe 44 in a quantity corresponding to the supply of water.

The absorption of the $SO_2$ and the dissolution of the lime is in this way performed in a very effective manner. Said reactions are namely in a high degree promoted by the effective sprinkling of the limestone filling and the circulation in the lower tower section where there is a very big total surface of the limestones, which are continually decreasing in size during their passage downwards. At the same time the circulation prevents the grating from being clogged up and consequently also the so-called "hanging" of the limestone filling is prevented.

The efficiency of the tower described is, consequently, very high and the tower may, therefore, be comparatively small in size and nevertheless have a great capacity.

If in the acid flowing out from the limestone tower the content of totally free $SO_2$ is to be increased, said acid is transferred into the tower 24. For this purpose the valve 45 is closed, the valves 41, 43, 46 and 38 are opened and the pumps 22 and 33 started. (For the present it may be assumed that also the valve 42 is closed.)

The raw acid from the limestone tower 1 is then introduced into and trickled down from the top of the tower 24. Here it meets the $SO_2$ gas supplied from the pipe 31 and passing upwards through the tower where its content of $SO_2$ is partly absorbed by the acid trickling down. The lime content of the acid being constant, the composition of the acid is thus changed only with regard to its content of free $SO_2$. Said content of free $SO_2$ may be varied as desired with regard to the utilization purpose of the acid by appropriate regulation of the quantity of acid circulated through the lower tower section. Like the pump 22 the pump 33 is so dimensioned that it can transfer a quantity of liquid several times as great as that supplied to the top of the tower. The raw acid thus enriched in $SO_2$ is then discharged from the tower through the overflow pipe 39.

The gas escaping from the top of the tower section 25 which generally still has a rather great content of $SO_2$ is then through the pipes 37 and 14 transferred to and introduced into the tower 1 where it is utilized in the manner described above. In this case, consequently, it is assumed that the $SO_2$ gas before being supplied to the tower 1 has been passed through the tower 24. In such cases, however, where the two towers 24 and 1 are operated simultaneously the $SO_2$ gas may also be supplied to the tower 1 partly direct from the pipe 40, partly via the tower 24. In the last-mentioned cases the valve 42 is also kept open and is regulated in the appropriate manner.

The method disclosed herein, and which forms the subject-matter of my divisional application, Serial No. 164,861, renders it possible when using limestone in lumps to produce continually bisulphite solutions of definite composition according to the conditions occurring by means of a very simple and cheap process and without difficulties caused by interruption in working. At the same time the plant described in comparison with the plants of this kind already known having the same capacity is considerably smaller in size and, consequently, will also require considerably lower building costs.

The method described may also include the production of magnesium bisulphite solutions or solutions containing magnesium bisulphite which may be obtained for instance by using dolomite instead of lime.

It should further be pointed out that in the design of the apparatus or plant described such alterations and modifications may be undertaken as do not influence the fundamental manner of working of the same and which lie within the scope of the invention. So, for instance, the middle part in the lower tower section of the limestone tower may be located eccentrically or the whole tower section in relation to the upper tower section may be displaced laterally or said middle part may even be omitted. It is only necessary that the tower sections in relation to each other are arranged in such a way that on the sinking downwards of the filling from the upper tower section into the lower section the above-mentioned conditions are fulfilled. Also in case of the tower in which the enrichment in $SO_2$ takes place the tower sections may be laterally displaced in relation to each other. In said tower, moreover, the filling with rings or the like, although advantageous, is not absolutely necessary. If, however, such a filling is dispensed with the tower must be of a considerably greater height. Also in other respects alterations or modifications within the scope of the invention may be undertaken.

Having now particularly described the nature of my invention and the manner of its operation what I claim is:

1. Apparatus of the class described comprising a tower including an upper absorption and reaction section and a lower absorption and reaction section for the reception of the material to be treated, said tower sections being disposed in such relation to each other that the material on its downward course from the upper reaction section into the lower reaction section is deflected laterally, a liquor-collecting chamber at the bottom of the tower, means for transferring solution from said collecting chamber to the top of the lower reaction section, sprinkling devices in communication with said solution-transferring means and disposed above the surface of the deflected material contained in said lower reaction section, means for supplying liquid from above to the upper reaction section, means for passing reacting gases through the reaction sections in countercurrent relationship to the liquid and solution passing therethrough, and means for discharging liquor from said collecting chamber.

2. Apparatus of the class described comprising a tower including an upper absorption and reaction section and a lower absorption and reaction section for the reception of the material to be treated, said tower sections being disposed in such relation to each other that the material on its downward course from the upper reaction section into the lower reaction section is deflected laterally and spread out leaving a free space between the material and the upper wall of the lower tower section, a solution-collecting chamber at the bottom of the tower, means for circulating solution from said collecting chamber through the lower reaction section, said means including sprinklers disposed in said free space above the material in said lower reaction section, means for spraying water from above over the material in the upper reaction section, means for passing gases through the reaction sections countercurrent to the direction of flow of water and circulating solution therein and means for discharging liquor from said collecting chamber.

3. Apparatus of the class described comprising a tower including an upper absorption and reaction section and a lower absorption and reaction section for the reception of the material to be treated, a grating at the bottom of the lower tower section for supporting said material, means for supplying a gas at the bottom of the tower, means for supplying and trickling down water and a gas exhaust at the top of the tower, a solution-collecting chamber at the bottom of the tower, said chamber having an outlet for discharge of liquor therefrom, the tower sections being of cylindrical form and disposed concentrically in relation to each other, the lower tower section having greater diameter than the upper section and being provided with a middle part projecting upwards from the bottom in the centre of said section and serving as a deflecting and distributing member in such a way that the material on its downward course from the upper tower section into the lower tower section is deflected laterally and spread out leaving a free space between the material and the upper wall of said lower section, a circulating pump communicating with said chamber, sprinkling devices communicating with said pump and disposed in said free space above the material in said lower tower section.

4. Plant for the production of bisulphite solutions by the interaction between water, $SO_2$ containing gases and a lime-bearing material in lump form, comprising, in combination, a limestone tower including an upper absorption and reaction section and a lower absorption and reaction section for the reception of said lime-bearing material, a water inlet and a gas outlet at the top of the tower, means for supplying $SO_2$-gases and a solution-collecting chamber at the bottom of the tower, said tower sections being disposed in such relation to each other that the lime-bearing material on its downward course from the upper reaction section into the lower reaction section is deflected laterally and spread out leaving a free space between the material and the upper wall of the lower tower section, means for circulating solution from said collecting chamber through the lower reaction section, said means including sprinklers disposed in said free space above the material in said lower reaction section, an absorption tower containing a filling of an insoluble interstitial material and provided with a liquor-collecting chamber at the bottom of the tower, means for transferring the solution produced in the limestone tower from the bottom of said tower to the top of the absorption tower and means for spraying it downwardly through said tower, means for passing $SO_2$ containing gases through the absorption tower in countercurrent relationship to the liquor trickling down therein, and means for discharging the sulphite acid liquor produced from said absorption tower.

5. Plant for the production of bisulphite solutions by the interaction between water, $SO_2$ containing gases and a lime-bearing material in lump form, comprising, in combination, a limestone tower including an upper absorption and reaction section and a lower absorption and reaction section for the reception of said lime-bearing material, a grating at the bottom of the lower tower section for supporting said material, means for spraying water from the top of the tower over the material therein, a solution-collecting chamber at the bottom of the tower, said tower sections being of cylindrical form and disposed concentrically in relation to each other, the lower tower section having greater diameter than the upper section and being provided with a middle part projecting upwards from the bottom in the centre of said section and serving as a deflecting and distributing member in such a way that the material on its downward course from the upper tower section into the lower tower section is deflected laterally and spread out leaving a free space between the material and the upper wall of said lower section, means for circulating solution from said collecting chamber through the lower reaction section including a circulating pump and sprinklers disposed in said free space above the material in said annular lower reaction section, an absorption tower including an upper and a lower reaction section, fillings of an insoluble interstitial material in said sections, a liquor collecting chamber at the bottom of said tower, means for transferring the solution produced in the limestone tower from the collecting chamber at the bottom of said tower to the top of the absorption tower and means for spraying it downwardly through said tower, means for passing $SO_2$ containing gases through the absorption tower and the limestone tower in series in countercurrent relationship to the direction of flow of liquid therein, means for circulating liquor from said collecting chamber at the bottom of the absorption tower through the lower section of said tower, and means for discharging the sulphite acid liquor produced from said absorption tower.

GUSTAF HAGLUND.